(12) United States Patent
Richter et al.

(10) Patent No.: US 6,804,586 B2
(45) Date of Patent: Oct. 12, 2004

(54) ARRANGEMENT FOR GENERATING CONTROL COMMANDS FOR ACTUATING FLAPS AND SLATS OF AN AIRCRAFT

(75) Inventors: Martin Richter, Bremen (DE); Dieter Lang, Stuhr (DE)

(73) Assignee: Airbus Deutschland GmbH, Hamburg (DE)

(*) Notice: Subject to any disclaimer, the term of this patent is extended or adjusted under 35 U.S.C. 154(b) by 0 days.

(21) Appl. No.: 10/695,618

(22) Filed: Oct. 27, 2003

(65) Prior Publication Data

US 2004/0128038 A1 Jul. 1, 2004

(30) Foreign Application Priority Data

Oct. 26, 2002 (DE) .......................................... 102 49 967

(51) Int. Cl.⁷ ................................................ G06F 7/00
(52) U.S. Cl. ............................... 701/3; 701/36; 244/89; 244/75 R
(58) Field of Search ............................... 701/1, 2, 3, 4, 701/5, 36; 244/75 R, 76 R, 87, 89, 175, 234, 235

(56) References Cited

U.S. PATENT DOCUMENTS

| | | | | |
|---|---|---|---|---|
| 4,236,685 A | * | 12/1980 | Kissel ......................... | 244/223 |
| 4,363,098 A | * | 12/1982 | Buus et al. ..................... | 701/4 |
| 5,077,671 A | * | 12/1991 | Leslie et al. ................... | 701/3 |
| 5,623,411 A | * | 4/1997 | Morvan ........................ | 701/14 |
| 6,038,498 A | * | 3/2000 | Briffe et al. ................... | 701/3 |
| 6,664,656 B2 | * | 12/2003 | Bernier ........................ | 307/9.1 |
| 6,704,624 B2 | * | 3/2004 | Ortega et al. .................. | 701/3 |

* cited by examiner

Primary Examiner—Richard M Camby
(74) Attorney, Agent, or Firm—W. F. Fasse; W. G. Fasse

(57) ABSTRACT

An arrangement for generating control commands for controlling the slats and landing flaps of an aircraft includes two manually operable command input levers which are arranged directly side-by-side or as a "rod-within-rod" and are connected respectively by two linkages to two rotatable sensor disks that respectively cooperate with two sets of signal emitters that are electrically connected respectively to two control computers. The two levers and two linkages are coupled to form a single command transducer having two coupled parallel command transmission paths. Based on the signals of the signal emitters, the control computers generate actuating signals that are provided to actuators for adjusting the positions of the slats and landing flaps. A mechanical disconnect or jamming of one mechanical command transmission path or a malfunction or failure of one of the sensor arrangements will not cause a failure of the slat and flap command functions, because the other command transmission path will remain functional.

15 Claims, 3 Drawing Sheets

ARRANGEMENT FOR GENERATING CONTROL COMMANDS FOR ACTUATING FLAPS AND SLATS OF AN AIRCRAFT

PRIORITY CLAIM

This application is based on and claims the priority under 35 U.S.C. §119 of German Patent Application 102 49 967.5, filed on Oct. 26, 2002, the entire disclosure of which is incorporated herein by reference.

FIELD OF THE INVENTION

The invention relates to an apparatus for actuating the flaps and/or slats of an aircraft, using a control command transducer embodied as a lever mechanism for generating the desired or specified commands for an adjustment of the flaps and/or slats.

BACKGROUND INFORMATION

Conventional transport aircraft are equipped with a control command transducer arrangement for actuating the flaps and/or slats of the aircraft. The arrangement typically includes a flap/slat command input lever mounted on the instrument panel or a console in the cockpit, for the pilot to select the desired flap/slat settings by sliding or pivoting the lever to the desired position corresponding to the desired flap/slat setting. A sensor arrangement is coupled to the command input lever and generates electrical sensor signals responsive to and dependent on the position of the command input lever. These sensor signals are provided to at least one control computer, which in turn responsively generates actuator signals that are provided to actuators for correspondingly actuating the flaps and/or slats to the commanded settings. The lever arrangement thus embodies a control command transducer that has only a singular mechanical command transmission path of the lever adjustments corresponding to the command inputs for adjusting the flaps and/or slats.

The conventional lever mechanism includes a control coulisse or control slide guide slot arrangement with a specified number of catches, that define the positions to which the command input lever can be moved and then fixed, so as to specify the corresponding allocated flap/slat setting. Furthermore, blocking means embodied as a baffle plate prevent the lever from being moved in a single continuous adjustment through its entire adjustment range, e.g. from the zero setting to the full extended setting, or vice versa, without stopping in the intermediate positions or settings.

The conventional control command transducer arrangements as described suffer disadvantages arising from the provision of only a singular mechanical command transmission path, including a single lever mechanism and a single sensor arrangement. In the event of the failure of this singular lever mechanism or sensor arrangement, for example due to fracture of any of the components, or due to mechanical jamming at any point within the single command transmission path or within the sensor arrangement, then the entire slat and landing flap system can no longer be actuated.

In order to avoid the dependence of the entire system on the operability of only a single command transducer arrangement, an alternative control switch could additionally be provided. In other words, a separate backup system could be provided to achieve safety redundancy. This, however, would require the installation of additional switches in the cockpit, and would also require special procedures for the pilots to follow to switch over from the normal command transducer arrangement to the backup system in the event of the malfunction or non-operability of the normal command transducer arrangement.

SUMMARY OF THE INVENTION

In view of the above, it is an object of the invention to provide an arrangement of the general type described above, which is further developed and improved, however, so that a mechanical rupture or jamming of a single mechanical command transmission path, or a failure of a single sensor arrangement, will not lead to a loss of the landing flap and slat actuation command function. Another object of the invention is to avoid the need for special procedures to be followed by the pilots in the event of a jamming or other malfunction of a single command transmission path. The invention further aims to avoid or overcome the disadvantages of the prior art, and to achieve additional advantages, as apparent from the present specification.

The above objects have been achieved according to the invention in an apparatus for actuating at least one of the slats and landing flaps on a wing of an aircraft, including double lever mechanisms forming a control command transducer for inputting desired adjustment commands for adjusting at least one of the slats and landing flaps. The two lever mechanisms are independent of each other in their layout and construction, but are coupled to each other in their function, and thereby form two functionally coupled command transmission paths. Each lever mechanism comprises a respective command input lever (also called an adjusting or actuating lever) and a respective linkage mechanically connecting the lever to a respective one of two rotatable sensor disks so as to apply the pivoting lever motion of the lever to a pivoting rotational motion of the disk. Each sensor disk cooperates with a respective group of plural signal emitters (e.g. electrical or optical signal emitters), which are conductively connected (e.g. by wires or optical fiber cables) to a respective one of two control computers. Responsive to the signals provided by the signal emitters, the computers in turn generate and transmit actuating signals (e.g. electrical or optical signals) to actuators connected to the respective slat or landing flap for actuating the same. In this context, the two lever mechanisms are functionally coupled and combined with each other to form a single control command transducer arrangement.

Thus, according to the invention, the lever mechanism is carried out in a double configuration, and is divided into two command transmission paths that are respectively independent from each other in their layout and construction, but are coupled to each other in their function. More particularly, two adjusting levers and two linkages are functionally combined to form a single control command transducer arrangement. Furthermore, the signal emitters of a respective sensor disk associated with a respective one of the linkages and adjusting levers are electrically connected to a respective one of the two control computers. This provides a parallel yet interconnected redundancy of the mechanical command transmission path, the sensor arrangement or signal conversion function, and the signal processing and flap or slat actuation.

According to further structural features of the invention, the adjusting levers (i.e. the command input levers) are respectively guided in a blockage-free sliding guide arrangement, having a guide slot with detent recesses on one side thereof and baffle protrusions on the other side thereof.

A spring-loaded detent catch member engages into any selected one of the detent recesses to fix the adjusting lever at a selected detented position. The baffle protrusions prevent a full range adjustment of the adjusting lever without intermediate stops in the detented positions. Further preferably, the sliding guide arrangement is enclosed in a housing so it is protected from jamming by foreign objects or contaminants, and the adjusting lever travel slot through which the lever passes into the housing is covered by a mechanical movable cover in the form of a rolling or lamellar door, an accordion-like bellows, or a movable sheet metal or plastic sliding cover. With such an arrangement, any loose or broken-off pieces of the arrangement cannot cause a blockage of the mechanism. Furthermore, foreign bodies or contaminants cannot penetrate into the guide slot of the sliding guide arrangement, which further prevents the occurrence of blockages.

With the inventive apparatus, even if one of the adjusting levers and/or one of the linkages and/or one of the sensor disks fails or becomes blocked or jammed, the slat or flap command functions can still be carried out by the continuing operation of the other lever, linkage, and/or sensor disk. There is no need for the pilot to switch over from a primary system to a backup system. With the doubled lever mechanism, the transmission and conversion and processing functions will all remain effective, because the second command input path through the second adjusting lever, the second linkage, and the second sensor disk will remain fully functional even in the event of a mechanical disconnect, failure, or blockage of any component of the first command transmission path.

More particularly, the probability of a total failure of the control command transducer arrangement for the redundant control computers can be reduced to $<10^{-9}$/Fh (flight hour). Namely, for a complete failure of the command signal transducer arrangement, both lever mechanisms would have to fail, because the inventive arrangement provides two redundant adjusting levers that are preferably functionally coupled or combined to functionally form one redundant operating lever, by means of mechanical synchronization or coupling of the two levers, for example by means of bolts, screws, rivets, or the like, or by means of a "lever within a lever" arrangement of the two levers. The coupling can be designed so that it can be overcome (e.g. by shearing of a mechanical coupling or by slipping of a frictional coupling) by an increased adjusting force being manually applied to one of the adjusting levers. Thereby, if one of the levers or linkages should become jammed, then the other lever and linkage can still be used normally to carry out the command functions simply by initially pushing the unjammed lever hard enough to decouple it from its normal detent gate. A mechanical rupture of one command path, or the complete failure of one sensor arrangement, will not lead to the loss of the slat or landing flap command function, because the second non-faulty path will continue to carry out the proper lever function including transmission of the valid adjusting commands through the remaining non-faulty sensor arrangement.

Furthermore, the invention achieves the advantage of avoiding the need of additional cockpit switches and required alternative cockpit procedures for activating a backup system. By avoiding the need for an alternative operating button, it becomes possible to achieve a significant simplification of the system design and layout, for example relating to the computer processor functionalities as well as the cockpit interface, and it becomes possible to maintain previous operating procedures, in an advantageous manner.

BRIEF DESCRIPTION OF THE DRAWINGS

In order that the invention may be clearly understood, it will now be described in detail in connection with an example embodiment, with reference to the accompanying drawings, wherein.

DETAILED DESCRIPTION OF A PREFERRED EXAMPLE EMBODIMENT AND OF THE BEST MODE OF THE INVENTION

Figure 1:
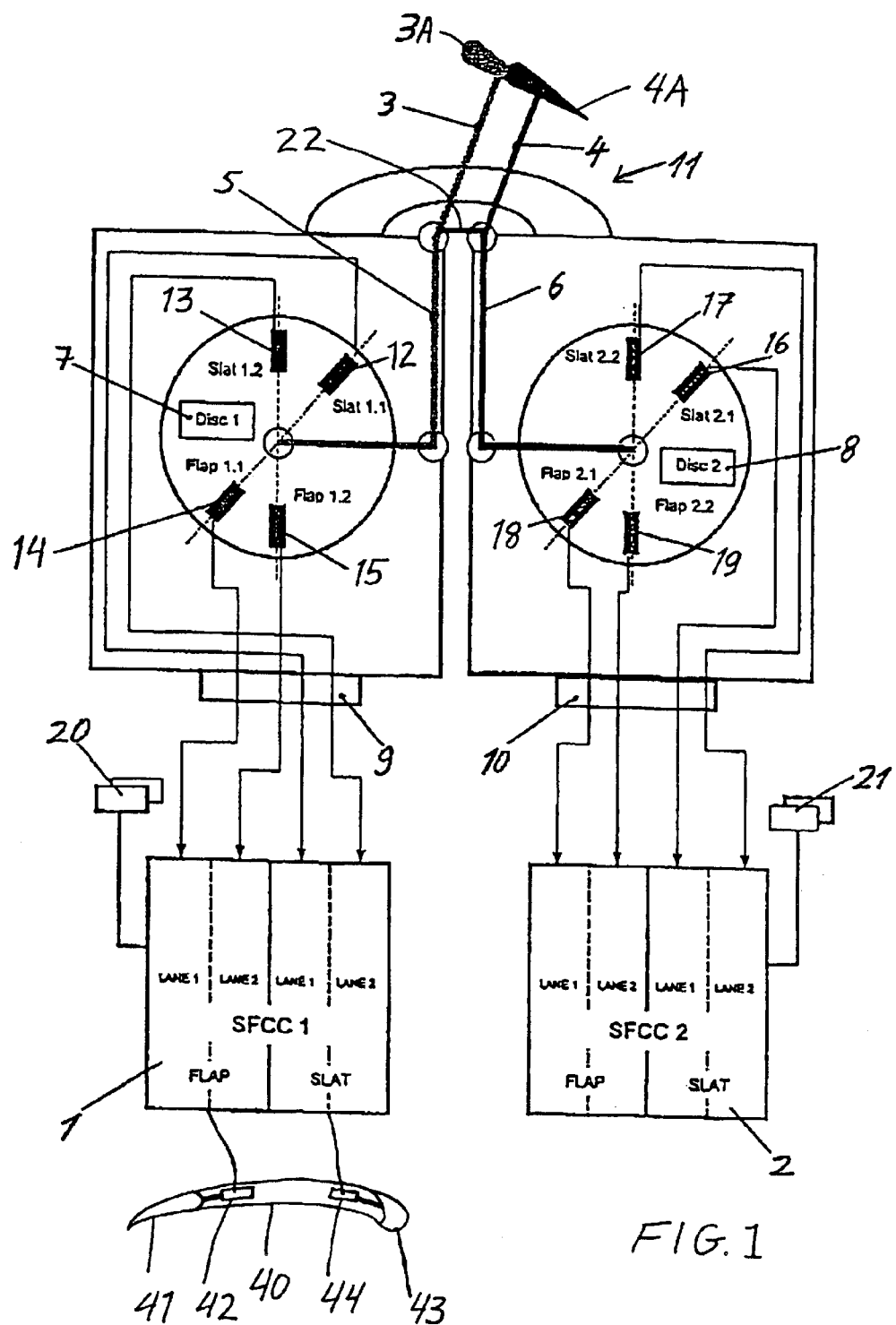
FIG. 1 is a schematic diagram of the general principles of an apparatus for generating commands for actuating at least one landing flap or slat of an aircraft according to the invention.

The schematic FIG. 1 gives a general overview of an apparatus for actuating at least one of landing flaps 41 and slats 43 on the right and left wings 40 of an aircraft. Actuator or adjusting arrangements 42 and 44 are respectively connected to and act on the landing flaps 41 and the slats 43 so as to adjust the extended or retracted position of the respective flap or slat. In this context, the actuators or adjusting arrangements 42 and 44 receive actuator control signals from two control computers 1 and 2, e.g. Slat/Flap Control Computers SFCC1 and SFCC2, which each include at least two separate computer channels or lanes for processing the flap commands and at least two separate computer channels or lanes for processing the slat commands.

The control commands for actuating the flaps and/or slats are initially input by the pilot in the cockpit of the aircraft, and the corresponding actuator control signals are generated, by means of the inventive arrangement that is schematically illustrated in FIG. 1 and shown in a concrete embodiment in FIGS. 2 to 5. The inventive arrangement includes a lever mechanism comprising first and second command input levers or adjusting levers 3 and 4 as well as first and second linkages 5 and 6, which respectively mechanically connect or couple the first and second adjusting levers 3 and 4 respectively with first and second rotatable sensor disks 7 and 8. The linkages can simply be shaft stubs which extend from the levers 3 and 4 to the disks 7 and 8 along a common rotation axis thereof, or can be rod linkages which link the motion of the levers to the disks having different rotation axes than the levers. The adjusting levers 3 and 4 and the linkages 5 and 6 are functionally combined or coupled to form a single command transducer arrangement. As mentioned above, the adjusting levers 3 and 4 are mechanically connected to each other, for example by means of bolts, screws, rivets or the like, or by a "rod-in-rod" arrangement of the two levers, to achieve a synchronization or coupling of these two levers, as schematically indicated by reference number 22. Lever knobs or handgrips 3A and 4A are respectively provided at the free upper ends of the two adjusting levers 3 and 4. This arrangement is installed in the instrument panel or a console of the aircraft cockpit, so that the pilot can grasp the handgrips 3A and 4A and thereby manually move the levers 3 and 4 to the selected lever position corresponding to the desired flap and/or slat setting.

The sensor disks 7 and 8 are rotated (through a limited angular range) by the pivoting movements of the levers 3 and 4 via the linkages 5 and 6. Each one of the two sensor disks 7 and 8 respectively comprises or cooperates with a group of four signal emitters, for example the sensor disk 7 cooperating with signal emitter 12 for a slat computer/processor 1.1 (indicating slat processor lane 1 of the control computer 1), signal emitter 13 for a slat computer/processor 1.2 (indicating slat processor lane 2 of the control computer 1), signal emitter 14 for a landing flap computer/processor 1.1, and signal emitter 15 for a landing flap computer/processor 1.2, and the sensor disk 8 cooperating with signal emitter 16 for a slat computer/processor 2.1, signal emitter 17 for a slat computer/processor 2.2, signal emitter 18 for a landing flap computer/processor 2.1, and signal emitter 19 for a landing flap computer/processor 2.2. All of the signal emitters 12 to 15 or 16 to 19 of a respective associated sensor disk 7 or 8 are respectively electrically connected to the associated control computer 1 or 2 via individual electrical conductor lines through a respective first or second electrical connector 9 or 10, for example an electrical connector plug 9 or 10, which allows the convenient modular installation or later replacement of the arrangement.

Thus, the signal emitters 12 to 15 or 16 to 19 emit sensor signals responsive to and dependent on the adjusted position of the levers 3 and 4, and these sensor signals are provided to the control computers 1 and 2, which in turn generate the actuator control signals responsive to and dependent on the sensor signals. Those actuator control signals are provided to the connected actuators 42 and 44 for correspondingly actuating the flaps 41 and slats 43 as described above. Furthermore, respective first and second reset switches 20 and 21 are provided in the overhead panel of the cockpit, and are respectively electrically connected to the first or second control computer 1 or 2 for resetting the same if activated by the pilot.

Preferably and advantageously, the lever mechanism is constructed in such a manner so that a mechanical jamming of one of the sensor disks 7 or 8 can always be overpowered for the further operation of the system, for example, if necessary, through increased operating force being applied thereto. The respective side of the dual or redundant lever mechanism that is not affected by the jamming can continue further to provide valid adjusting commands via the other redundant sensor arrangement to the respective control computer 1 or 2. In this context, the unjammed lever 3 or 4 can still continue to be manually moved in the normal operating manner, if applicable after the mechanical or frictional coupling 22 between the two levers has been overcome by exerting an increased operating force on the unjammed lever as described above.

Additionally, the adjusting levers 3 and 4 are preferably slidingly guided in a blockage-free enclosed slide guide arrangement 11. In this manner, loose or broken-off parts of the arrangement cannot lead to a blockage of the mechanism. Furthermore, in order that undesired foreign bodies or contaminants cannot penetrate into the arrangement, the open slot through which the levers 3 and 4 extend into the housing 24 of the arrangement is preferably covered by a mechanical cover 25 in the form of a roller door or lamellar door, or an accordion-like bellows, or a slidable sheet metal or plastic cover. These features can be understood further in connection with FIGS. 2 to 5.

Figure 2:
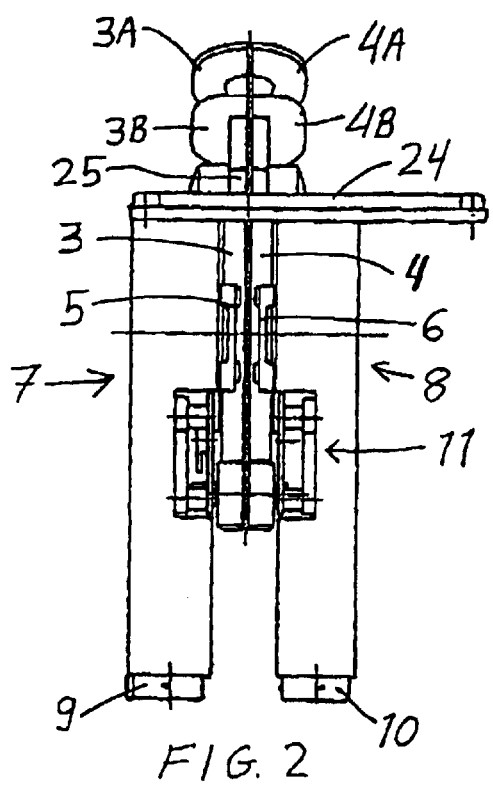
FIG. 2 is a front elevation view of an actual example embodiment of the apparatus according to FIG. 1.
Figure 3:
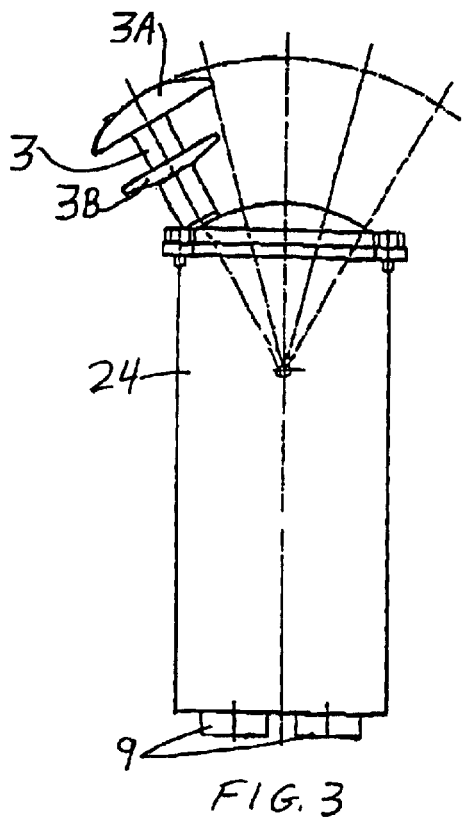
FIG. 3 is a side elevation view of the embodiment of FIG. 2.
Figure 4:
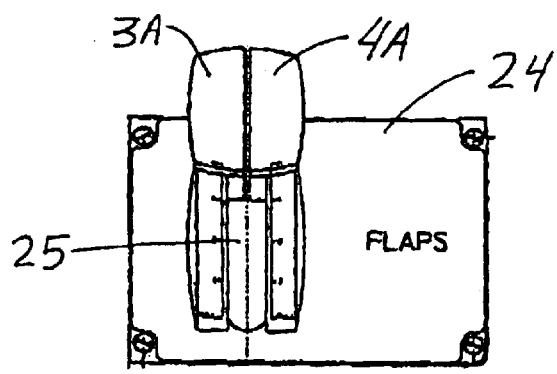
FIG. 4 is a top plan view of the embodiment of FIG. 2.

As can be seen especially in FIGS. 2 and 4, the two handgrips 3A and 4A of the two adjusting levers 3 and 4 are arranged directly side-by-side next to each other, and have mirror-symmetrical configurations that complement each other to effectively form a single handgrip. The two levers 3 and 4 are normally operated together in unison, effectively as a single lever mechanism, by the pilot gripping the two handgrips 3A and 4A together in common and moving them in unison. As also mentioned above, if necessary, in the event one of the lever mechanisms becomes jammed, the other unjammed lever can be moved separately from the jammed lever, or it is possible to decouple it from its normal detent gate by manually applying higher manual operating forces. In order to move the levers 3 and 4, it is first necessary to release the detented fixing of the levers in the respective existing position. This is achieved by lifting up on the detent release collars 3B and 4B provided slidingly on the levers 3 and 4 below the handgrips 3A and 4A. Then the levers 3 and 4 may be moved successively to any desired one of five available pivot positions corresponding to five available flap/slat settings.

Figure 5:
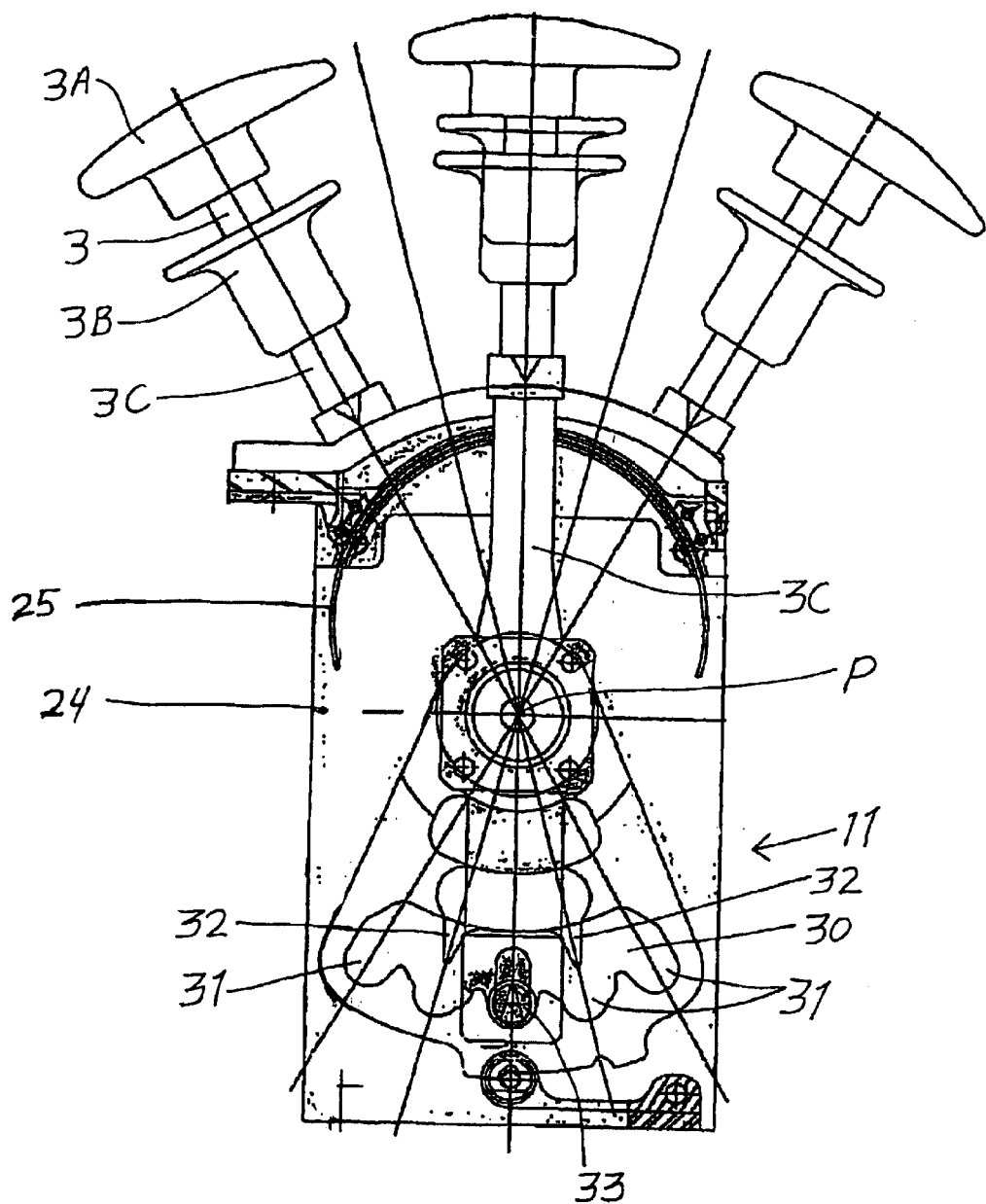
FIG. 5 is a broken-open view of the upper portion of the embodiment as shown in FIG. 3, to illustrate the internal components thereof, with the command input lever shown alternatively in three of five available adjustment positions.

The detent mechanism can be understood especially in connection with FIG. 5, which shows the internal mechanism associated with the adjusting lever 3, while the other adjusting lever 4 has a mirror-symmetrical arrangement on the other side within a housing 24. The detent release collar 3B is connected to a hollow shaft or lever 3C that is slidably arranged coaxially on the adjusting lever 3. Thereby the detent release collar 3B is connected to a detent catch member 33 located below the pivot point P of the lever 3. The detent catch member 33 (e.g. via the hollow shaft 3C) is spring-loaded in a downward direction, but can be lifted upward by a manual lifting force applied to the detent release collar 3B. As the lever 3 is pivoted about pivot point P, the detent catch member 33 pivots along a generally arcuate guide slot 30.

Five successive detent recesses 31 are provided along the bottom side or edge of the guide slot 30, while two baffle protrusions 32 are provided along the upper side or edge of the guide slot 30. The spring-loaded detent catch member 33 is biased to detent into any respective selected one of the detent recesses 31. The pivoting travel of the catch member 33 is blocked respectively by the baffle protrusions 32, which thereby prevent the lever 3 from being moved in a single full travel stroke from one end position to the opposite end position with the detent release collar 3B lifted, i.e. without intermediately allowing the catch member 33 to detent into intermediate ones of the detent recesses 31.

FIGS. 4 and 5 further show the slidable cover 25 arranged around the respective levers 3 and 4, to cover or close the open slot through which the levers extend into the enclosed housing 24. The slidable cover 25 may be an arcuate curved sheet metal or plastic plate that slides in an arcuate groove along with the pivoting travel of the lever, or it may be a bellows or the like. In any event, the cover 25 provides a positive closure of the housing 24 at this opening slot, to prevent foreign matter from penetrating into the housing and potentially jamming the lever mechanism or the detent mechanism.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An arrangement for generating control commands for actuating at least one of flaps and slats of an aircraft, comprising:

manually operable first and second command input levers;

rotatable first and second sensor disks;
a first linkage connecting said first command input lever to said first sensor disk, and a second linkage connecting said second command input lever to said second sensor disk, wherein said first and second linkages are adapted to transmit lever motions of said first and second command input levers respectively to limited rotation motions of said first and second sensor disks;
first and second groups of signal emitters respectively cooperating with said first and second sensor disks to emit command signals dependent on and responsive to respective rotational positions of said first and second sensor disks; and
a first control computer having inputs conductively connected to said first group of signal emitters to receive said command signals therefrom, and a second control computer having inputs conductively connected to said second group of signal emitters to receive said command signals therefrom, wherein said first and second control computers are respectively adapted to generate actuating signals for actuating at least one of flaps and slats of an aircraft responsive to and dependent on said command signals, wherein said actuating signals are provided at outputs of said first and second control computers.

2. The arrangement according to claim 1, wherein said first command input lever, said first linkage and said first sensor disk form a first command input mechanical transmission path, wherein said second command input lever, said second linkage and said second sensor disk form a second command input mechanical transmission path, and wherein said first and second command input mechanical transmission paths are independently operable but functionally coupled with respect to each other.

3. The arrangement according to claim 1, further comprising actuators that are conductively connected to said outputs of said first and second control computers to receive said actuating signals therefrom, and at least one of flaps and slats mechanically connected to said actuators.

4. The arrangement according to claim 3, wherein said inputs of said control computer are electrically conductively connected to said signal emitters, and said actuators are electrically conductively connected to said outputs of said control computers.

5. The arrangement according to claim 1, further comprising first and second handgrips arranged on respective free ends of said first and second command input levers, and wherein said first and second command input levers are arranged directly side-by-side adjacent each other or with one lever path of one of said levers inside another lever path of another of said levers, in a cockpit of the aircraft to enable common mutual manual grasping of said handgrips and common mutual operation of said levers.

6. The arrangement according to claim 1, wherein said first and second command input levers are mechanically connected to each other by a mechanical connection.

7. The arrangement according to claim 6, wherein said mechanical connection is designed and constructed to be disruptable so as to disconnect said levers by application of a manual force to one of said levers.

8. The arrangement according to claim 6, wherein said mechanical connection can be manually disengaged or disconnected so as to disconnect said levers from one another.

9. The arrangement according to claim 1, wherein said first and second command input levers are frictionally coupled to each other by a frictional coupling.

10. The arrangement according to claim 9, wherein said frictional coupling is designed and constructed to be overcome so as to decouple said levers from one another by application of a manual force to one of said levers.

11. The arrangement according to claim 1, wherein said first and second command input levers are not connected to each other.

12. The arrangement according to claim 1, wherein said command input levers, said linkages and said sensor disks are designed and constructed so that any jamming of one of said sensor disks can be overpowered by a manual operating force applied to said command input levers.

13. The arrangement according to claim 1, further comprising a slide guide arrangement by which said first and second command input levers are slidingly guided, including at least one guide slot with detent recesses on one side and baffle protrusions on another side thereof, and including a catch member that is connected to a respective one of said levers and is biased to detent into any selected one of said detent recesses.

14. The arrangement according to claim 1, further comprising a housing and at least one mechanical cover that positively movably covers or closes a slot through which said command input levers extend into said housing, wherein said mechanical cover comprises at least one of a roller door, a lamellar door, a bellows, a slidable metal cover plate, and a slidable plastic cover plate.

15. The arrangement according to claim 1, wherein, in the event of one of said levers becoming jammed, the jammed one of said levers can be decoupled from a normal detent gate thereof by application of an increased manual operating force.

* * * * *